（12）United States Patent
Helmetsie et al.

(10) Patent No.: US 6,568,650 B2
(45) Date of Patent: May 27, 2003

(54) LAPTOP ACCESSORY

(75) Inventors: Gene Helmetsie, Spencer, NY (US); Alan Hedge, Ithaca, NY (US)

(73) Assignee: Pelican Design, Spencer, NY (US)

( * ) Notice: Subject to any disclaimer, the term of this patent is extended or adjusted under 35 U.S.C. 154(b) by 0 days.

(21) Appl. No.: 10/001,646

(22) Filed: Oct. 31, 2001

(65) Prior Publication Data

US 2003/0080264 A1 May 1, 2003

(51) Int. Cl.⁷ ............................................ F16M 11/00
(52) U.S. Cl. ............... 248/678; 248/205.2; 248/346.01; 248/676; 248/917; 248/918
(58) Field of Search ................. 248/918, 676, 248/678, 346.01, 349.1, 917, 205.2; D7/130, 45, 21

(56) References Cited

U.S. PATENT DOCUMENTS

| | | | | |
|---|---|---|---|---|
| 40,264 A | * | 10/1863 | Hunt | 248/346.01 |
| 2,216,457 A | * | 10/1940 | Salisbury | 126/211 |
| D246,883 S | * | 1/1978 | Di Ruscio | D7/130 |
| D263,919 S | * | 4/1982 | Anderson | D7/130 |
| 4,648,603 A | | 3/1987 | Hayford, Jr. | 273/148 B |
| 5,143,341 A | | 9/1992 | Juster | 248/444 |
| 5,154,391 A | * | 10/1992 | Hegarty | 248/205.2 |
| 5,232,276 A | * | 8/1993 | Martin | 312/208.4 |
| 5,263,423 A | | 11/1993 | Anderson | 108/43 |
| 5,337,985 A | | 8/1994 | Hale | 248/174 |
| 5,470,041 A | * | 11/1995 | Cucinotta | 248/346.03 |
| 5,503,361 A | * | 4/1996 | Kan-O et al. | 248/456 |
| 5,553,824 A | * | 9/1996 | Dutra, Jr. | 108/93 |
| 5,623,869 A | * | 4/1997 | Moss et al. | 108/43 |
| 5,722,624 A | * | 3/1998 | Watt et al. | 248/205.1 |
| 5,769,369 A | | 6/1998 | Meinel | 108/45 |
| 5,859,762 A | * | 1/1999 | Clark et al. | 248/122.1 |
| 5,871,094 A | | 2/1999 | Leibowitz | 206/320 |
| 5,927,669 A | * | 7/1999 | Sassman | 248/205.2 |
| 5,937,765 A | | 8/1999 | Stirling | 108/43 |
| 6,109,050 A | | 2/2000 | Ranta | 108/6 |
| D425,754 S | * | 5/2000 | Matteson | D7/409 |
| 6,113,050 A | * | 9/2000 | Rush | 248/346.01 |
| D460,294 S | * | 7/2002 | Webb | D6/462 |

* cited by examiner

Primary Examiner—Anita King
Assistant Examiner—Amy J. Sterling
(74) Attorney, Agent, or Firm—Brown & Michaels, PC

(57) ABSTRACT

An accessory for a laptop having a support with louvers that are placed so that passages of air may circulate between the support and laptop, which is spaced away from the computer using pins connected to the louvers. There are legs that attach to the support and pivot between two positions, using and storage. The support is fastened to the computer using hook-and-loop material, which is placed at either end of the central strip of the support. The corresponding pieces of hook and loop material are placed on the laptop in the analogous locations.

4 Claims, 5 Drawing Sheets

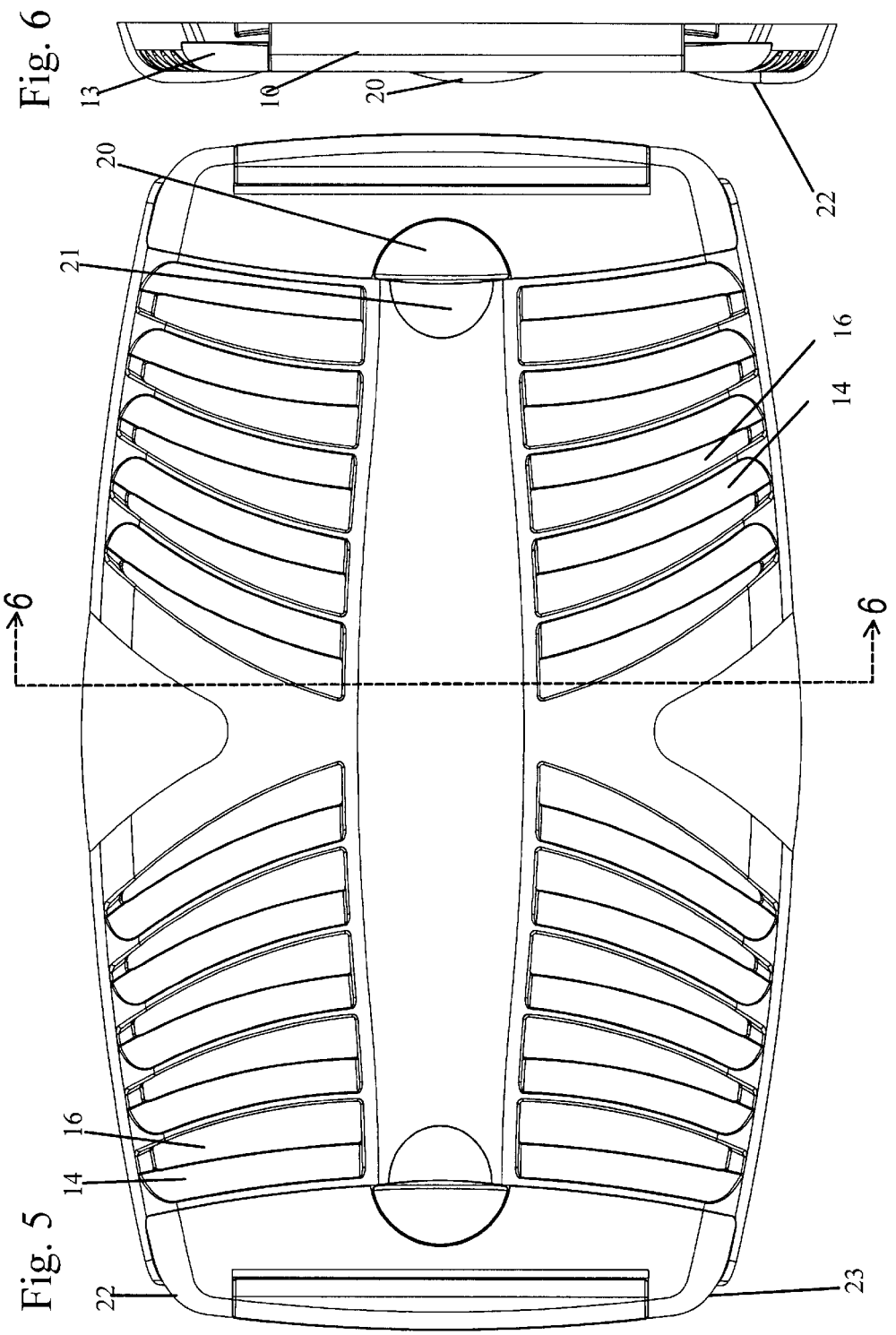

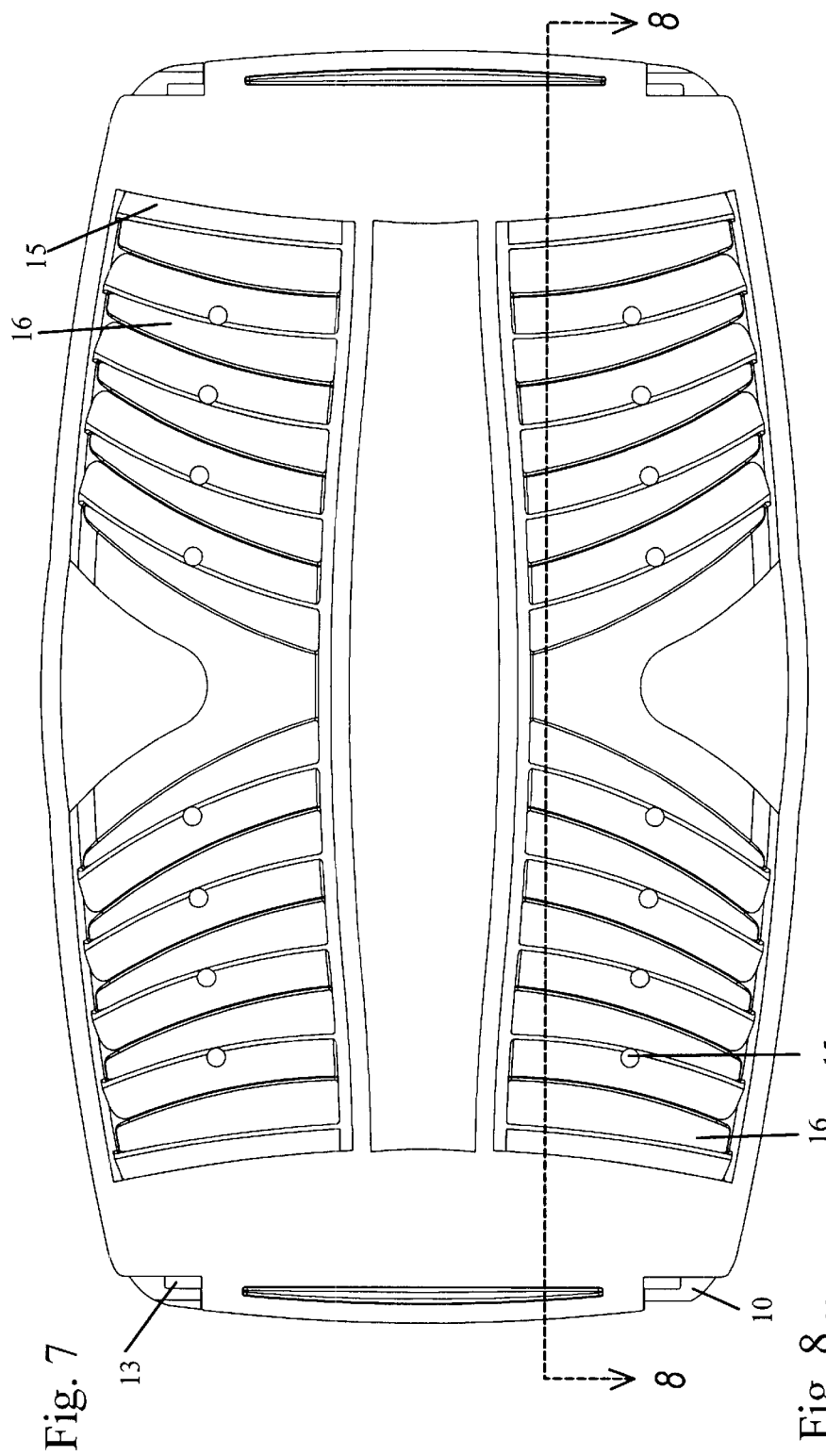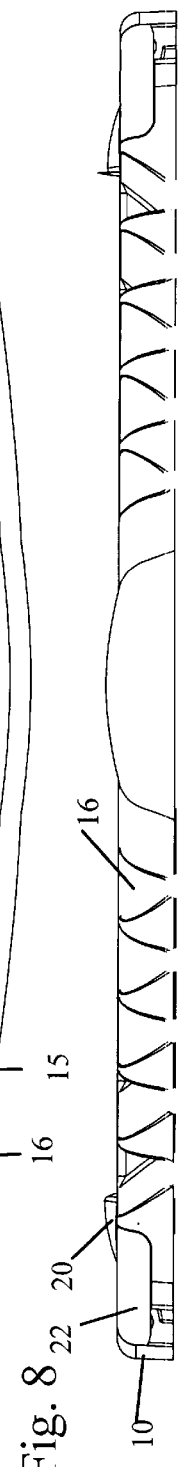

LAPTOP ACCESSORY

BACKGROUND OF THE INVENTION

1. Field of the Invention

The invention pertains to the field of accessories for portable computers. More particularly, the invention pertains to attachments for supporting a laptop computer while the computer is on the user's lap or another surface.

2. Description of Related Art

Laptop computers have become commonplace in recent years. In order to make the time of the user a more pleasant one, numerous accessories have been developed for the laptop. Some of the most important of these are the accessories that elevate and support the laptop while the user has the laptop on their lap or on another surface.

Laptops have a flat bottom that always rests on a surface when the laptop is in use. A channel of air cannot get between the bottom surface of the laptop and surface upon which it is resting on. Plus, when the computer is on the user's lap, the computer gives off heat that warms the legs to a considerable extent, which is bothersome to the user and is potentially damaging to the computer. Furthermore, the bottom of the laptop is constantly being worn and scratched when it is always being moved around and placed on hard surfaces, such as a table or desk.

Setting a laptop flat on a table or other surface introduces other problems. It is ergonomically desirable in many cases to have the keyboard at a slight angle, either with either the front or back edge higher. While keyboards for desktop computers often have feet which allow the rear to be lifted, few laptops have such feet built in. In some cases, there is a problem with liquid crystal displays, which have limited vertical angles of view. If one does not have the screen within this viewable angle of incidence then screen image may be hard to read. Prior art laptop accessories have tried to compensate for this by making the angle adjustable for the user when the laptop is on the table or another hard surface.

There are various laptop accessories in the prior art. For example, Hayford's "Video Game Control Console," U.S. Pat. No. 4,648,603, issued on Mar. 10, 1987, shows a lap-tray designed to support a video gaming console on one's lap using straps. Another example, Juster's "Resilient Keyboard Rest and Lap Adapter," U.S. Pat. No. 5,143,341, issued on Sep. 1, 1992, shows a rest for the lap made of foam with channels cut out to provide air circulation and to allow cables such as the power cable to pass through underneath. Anderson's "Article Securement Device," U.S. Pat. No. 5,263,423, issued on Nov. 23, 1993, shows a device that is fitted to and attaches the laptop to the leg. The device is secured using straps having Velcro. The device also folds for storage. Hale's "Support Device for a Laptop Computer," U.S. Pat. No. 5,337,985, issued Aug. 16, 1994 exhibits a "V" shaped support for a laptop that is fastened by Velcro to the bottom of the laptop. When the device is not in use it folds for storage. Leibowitz's "Laptop Computer Case and Stand," U.S. Pat. No. 5,871,094, issued Feb. 16, 1999, shows a laptop case cover that turns into a stand. Stirling's [Rach, Inc.] "Leg Supported Platformn for Laptop Computers," U.S. Pat. No. 5,937,765, issued Aug. 17, 1999, shows a rigid platform that has a cut out for the user's leg. The platform is secured to the leg using straps. The cut out has non-slip surfaces so as to provide friction. Ranta's "Portable and Adjustable Table with Improved Leg Assembly," U.S. Pat. No. 6,019,050, issued Feb. 1, 2000, shows a table for a laptop computer and other things that has adjustable legs.

The Middleton Group, Inc, of Cincinnati, Ohio, markets an expandable, compact lap desk made of aluminum, that supports the laptop computer on the user's lap under the trademark JACK OF ALL TRAYS™. Another product that is marketed is the Laptop Soft-Seat, which is made by Ray Novotny of Wauconda, Ill., that is a seat for a laptop that is made of aluminum that distributes heat, has a non-scratch pad, and is padded on the bottom.

SUMMARY OF THE INVENTION

The invention is a modern laptop accessory comprising at least one support that is attached to the bottom of the laptop by hook-and-loop fastener material (sold under the trademark Velcro®) or other means. The body of the support has louvers, with support pins, which provide an amount of space to allow air circulation. The support has at least one leg which can be extended to raise one side of the laptop. In the preferred embodiment, the accessory comprises a pair of supports, running from front-to-back on each side of a laptop.

BRIEF DESCRIPTION OF THE DRAWING

FIG. 5 shows an enlarged view of the bottom of the accessory.

FIG. 6 shows a side cut-away view of the accessory along lines 6—6 in FIG. 5.

FIG. 7 shows an enlarged view of the laptop side of the accessory.

FIG. 8 shows a cross-section of the bottom of the accessory along lines 8—8 in FIG. 7.

DETAILED DESCRIPTION OF THE INVENTION

Figure 10:
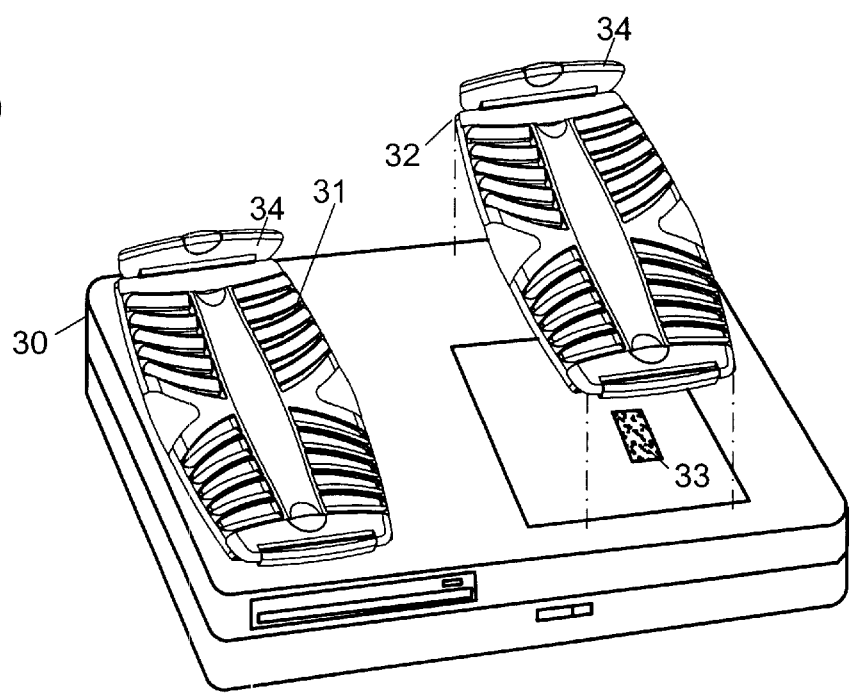
FIG. 10 shows an isometric view of a laptop computer having the accessory installed.

It will be understood that while the accessory could be used with only one support unit, in a preferred embodiment, two units will be used, as is shown in FIG. 10, in which a laptop (30) is shown with support units (31) and (32). As can be seen in that figure, it is preferable to attach the support units (31) and (32) to the bottom of laptop (30) with mating pieces of hook and loop fastener material (sold under the trademark Velcro®) (33) or some other easily removable fastening material. If desired, however, glue or double-sided adhesive tape or some other more permanent attachment could be used, although, as can be seen in the figure, this might impair access to battery compartments or other covers in the laptop.

Figure 9:
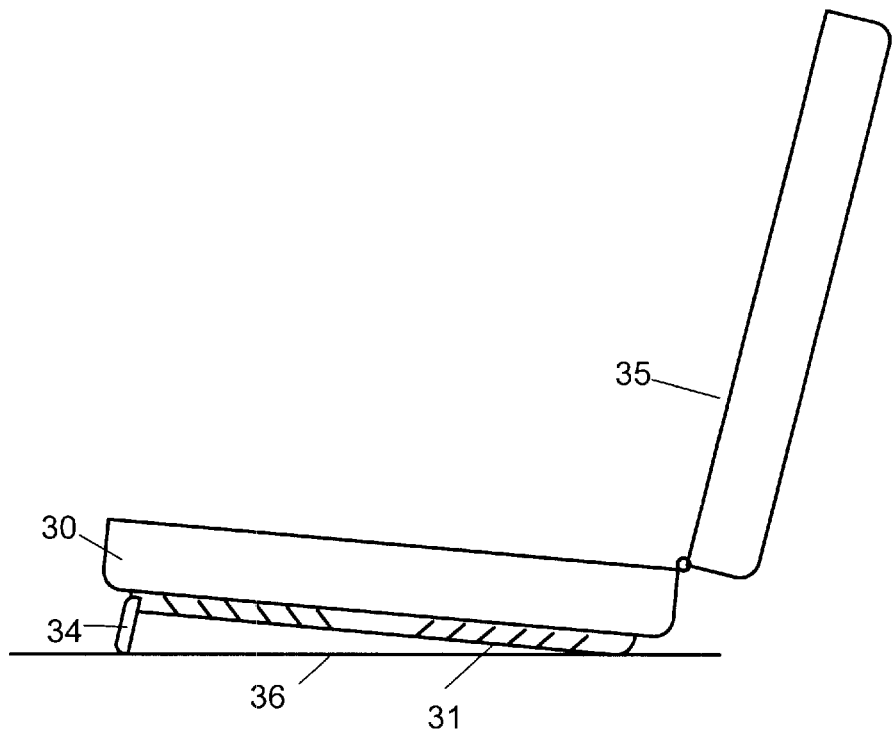
FIG. 9 shows a side view of a laptop computer having the accessory installed.

FIG. 9 shows a laptop (30), with the screen (35) raised into viewing position. One of the support units of the laptop accessory of the invention (31) can be seen between the laptop (30) and the table (36) on which it rests. The front leg (34) of the accessory has been lowered, raising the front of the laptop (30) for ergonomic positioning of the user's wrists.

Figure 1:
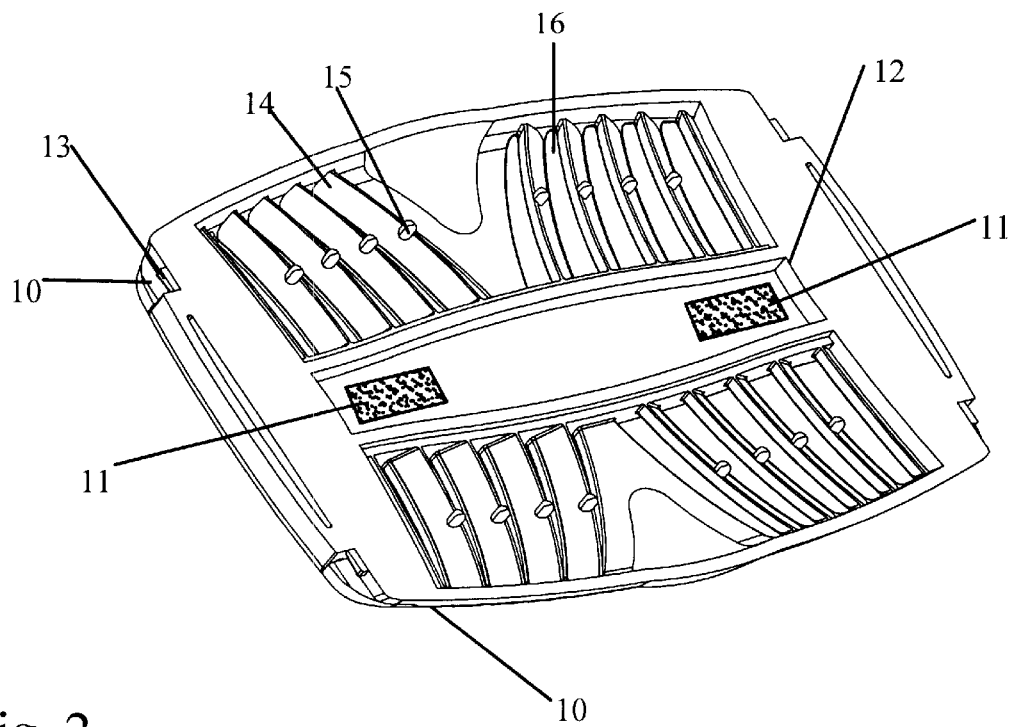
FIG. 1 shows an isometric view of the laptop side of the accessory.

Referring to FIG. 1, one support unit of the laptop accessory is shown with the laptop side up. The support unit consists of a support (10) with openings (16) allowing air circulation. The openings (16) are formed by louvers (15), which are placed adjacent to a central strip (12) in the support on both the left and right sides. On top of the louvers (extending toward the bottom surface of the laptop when in use) are pins (15), which contact the bottom surface of the laptop and keep the louvers from bending and preventing the proper air circulation.

Connected to the central strip (12) is half of the hook and loop material (11). The other half of the material is placed on the laptop at the corresponding positions (FIG. 10, (33)). On the ends of the support device (10), there are four dowel shape protrusions (13), which form hinges for the pivoting legs (22).

Figure 2:
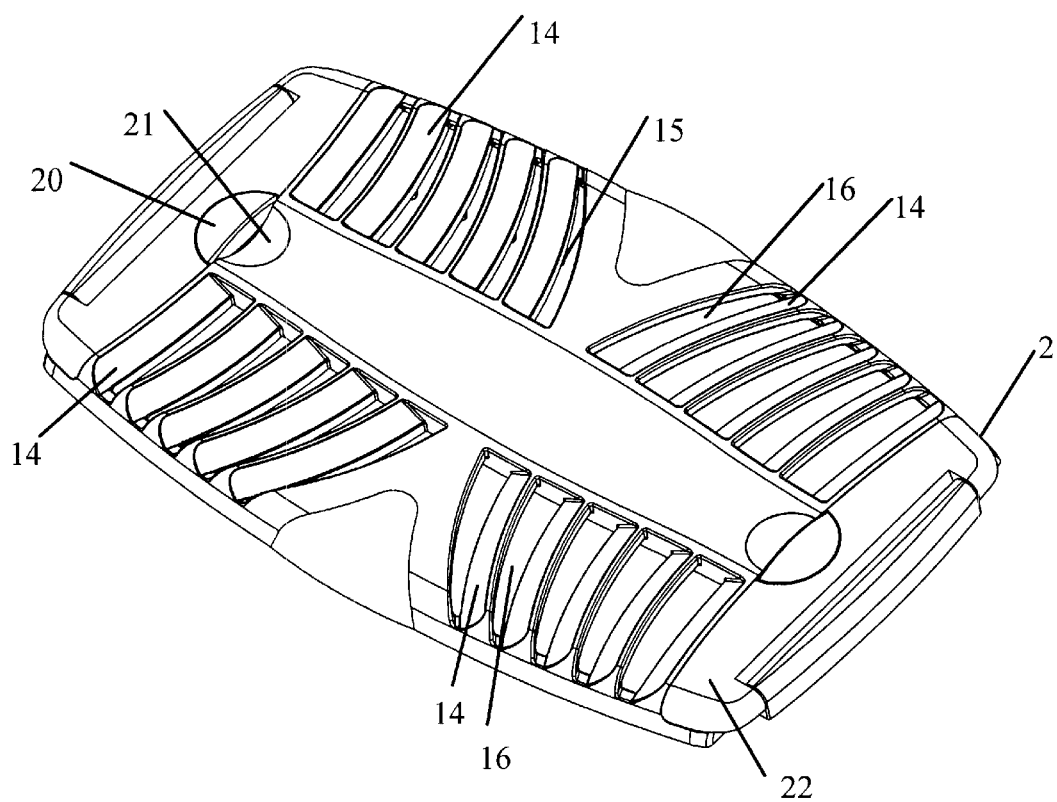
FIG. 2 shows an isometric view of the bottom of the accessory.

In FIG. 2, the bottom of the laptop accessory (i.e. the part which rests on the table top or lap) is seen. On the bottom of the central strip (12), two concave depressions (21) are present. On the pivoting legs (22), two convex bulges (20) have been made, to aid the user in moving the leg (22) from its folded or storage position shown in FIG. 1 to its operational or extended position shown in FIG. 3. There are preferably two legs (22) on each support unit, so that either the front or the back of the laptop can be raised in use, depending on the user's wishes. This also allows the support units to be symmetrical, and thus there is no "front" or "back" to worry about in attaching the units to the laptop.

Figure 3:
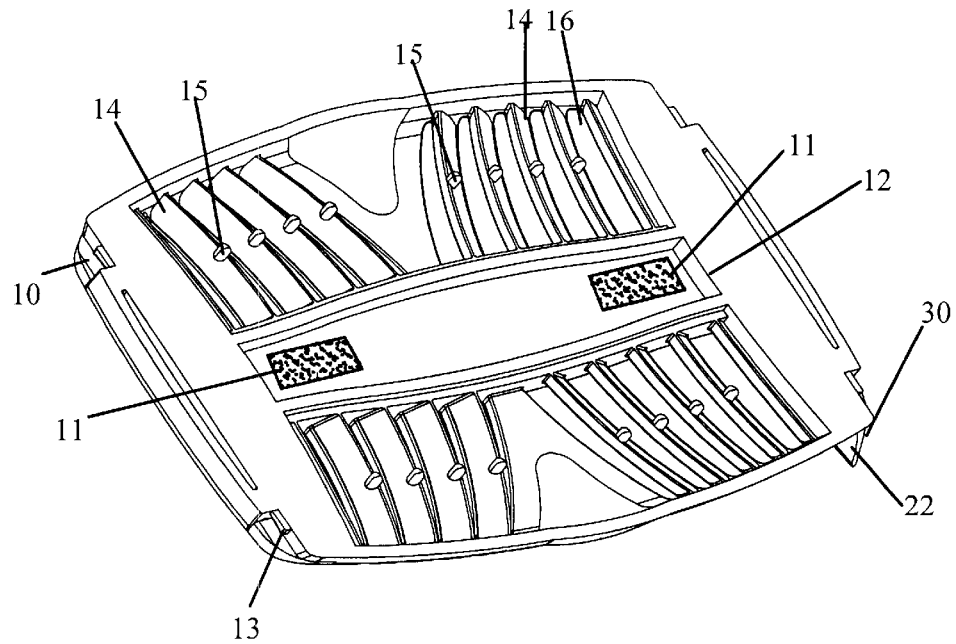
FIG. 3 shows an isometric view of the laptop side with one of the pivoting feet extended.

In FIG. 3, the laptop side of a support unit of the accessory is seen, as in FIG. 1. The leg (22) is seen in the using position (30). The leg (22) attaches to the dowels (13) at the end of the support (10).

Figure 4:
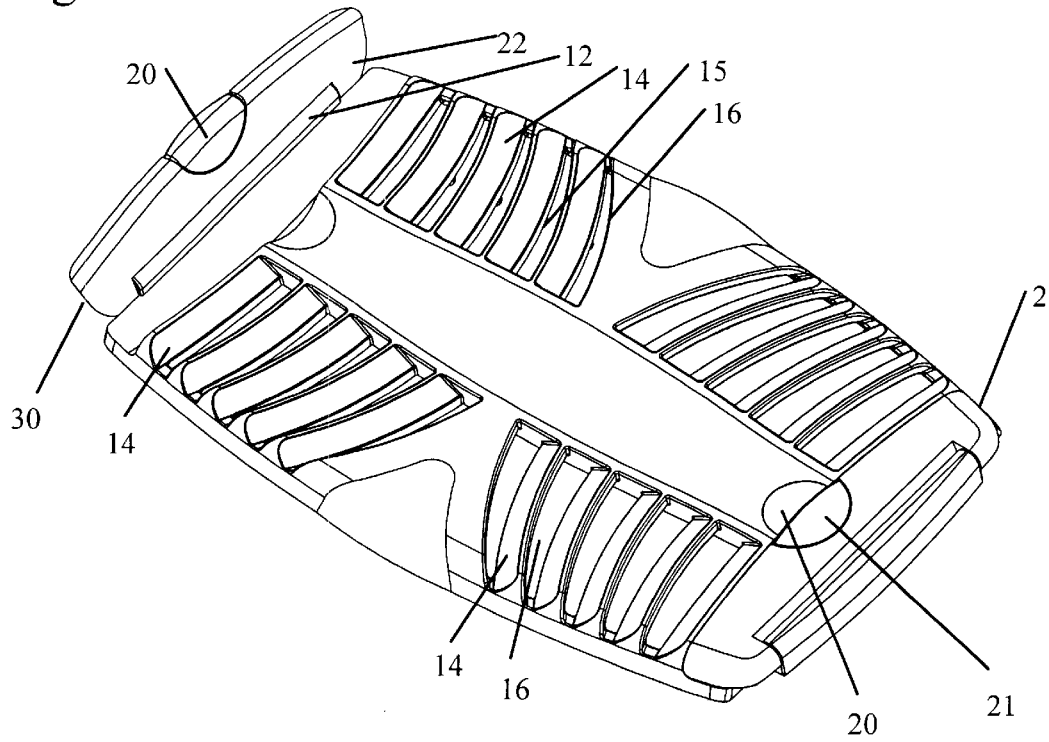
FIG. 4 shows an isometric view of the bottom with one of the pivoting feet extended.

FIG. 4 shows the bottom of the accessory with one of the legs (22) extended to the using position (30). To move the leg (22) from the storage position (23) to the using position (30), on the leg (22) there is a convex bulge (20) that in conjunction with the depression (21) in the central strip (12) allows the user to move the leg (22) to either the storage position (23) or the using position (30). Pivotal motion is seen when the leg (22) is moved from storage position (23) to using position (30) and alternatively from using position (30) to storage position (23).

FIG. 5 is an enlarged view of the bottom of the support (10) with the legs (22) attached in storage position (23).

FIG. 6 is a side cut-away view of the end of the support (10) when the leg (22) is attached, along the lines 6—6 of FIG. 5.

FIG. 7 is an enlarged view of the laptop side of the support (10) with one leg (22) on and one leg (22) off.

FIG. 8 illustrates a cross-sectional view of the bottom of the support with the legs (22) in storage position (23), along lines 8—8 of FIG. 7.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An accessory for portable computers comprising at least one support unit attachable to a bottom surface of a portable computer for supporting the portable a computer on a surface, the support unit comprising:

a body having a first end and a second end, the first end and second end being adjacent a front edge and back edge of the bottom surface of the portable computer when the support unit is attached thereto, the body having a plurality of louvers with spaces there between for permitting air flow through the body to the bottom surface of the portable computer;

a first folding leg mounted to the body adjacent the first end, capable of being extended from a storage position substantially flush with the body to a support position extending outward from the body;

a second folding leg mounted to the body adjacent the second end, capable of being extended from a storage position substantially flush with the body to a support position extending outward from the body; and at least one temporary fastener on a surface of the support unit which is adjacent to the bottom surface of the portable computer, such that when the support unit is in contact with the bottom surface of the portable computer, the temporary fastener on the surface of the support unit mates with a temporary fastener on the bottom surface of the portable computer, the support unit being removably attached to the bottom surface of the portable computer by the mating temporary fasteners.

2. The accessory of claim 1, in which the temporary fastener comprises hook and loop fastener material.

3. The accessory of claim 1, further comprising at least one pin on the plurality of louvers, extending from the louvers in the direction of the bottom surface of the portable computer, the pin having sufficient length that when the support unit is attached to the bottom surface of the portable computer, the pin supports the louver against the bottom surface.

4. The accessory of claim 1, in which there are two support units, for attachment on right and left sides of the bottom surface of the portable computer.

* * * * *